C. A. PIPENHAGEN.
INSECT TRAP.
APPLICATION FILED MAR. 3, 1913.
1,139,717.
Patented May 18, 1915.
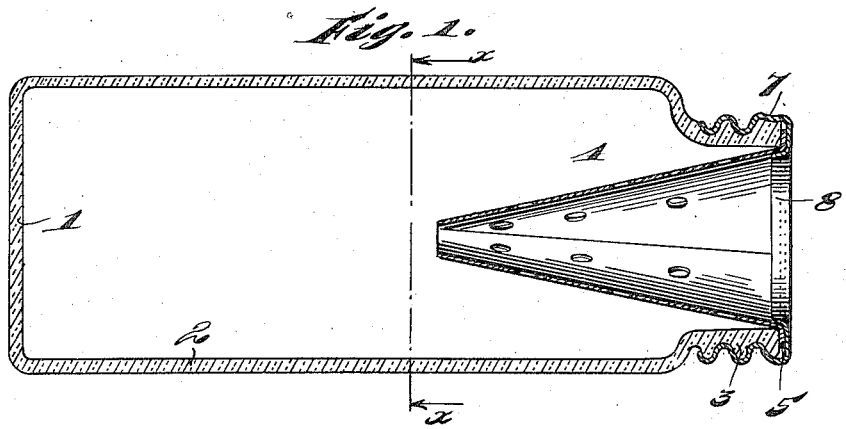
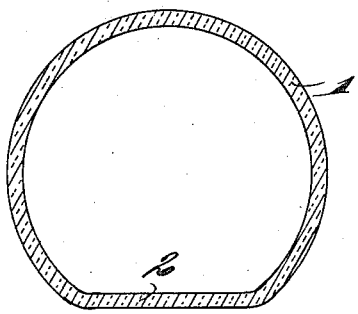
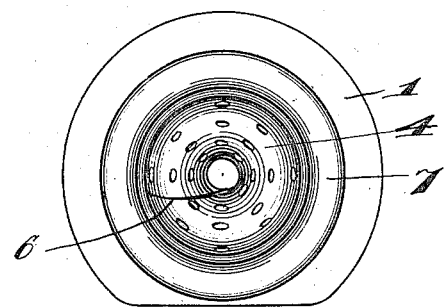
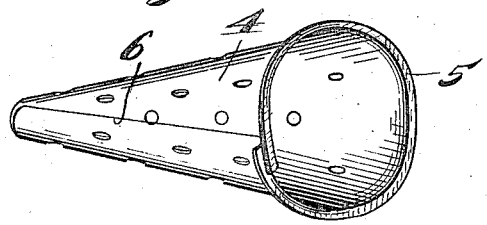
Witnesses:
C. E. Wessels.
B. M. Richards
Inventor:
Charles A. Pipenhagen,
By Joshua R. H. Potts
his Attorney.

UNITED STATES PATENT OFFICE.

CHARLES A. PIPENHAGEN, OF CHICAGO, ILLINOIS.

INSECT-TRAP.

1,139,717.             Specification of Letters Patent.      Patented May 18, 1915.

Application filed March 3, 1913. Serial No. 751,958.

*To all whom it may concern:*

Be it known that I, CHARLES A. PIPENHAGEN, a citizen of the United States, and a resident of the city of Chicago, county of Cook, and State of Illinois, have invented certain new and useful Improvements in Insect-Traps, of which the following is a specification.

My invention relates to improvements in insect traps especially adapted for the capture of roaches and the like, the object of the invention being to provide an improved trap of this character which is of simple construction and efficient in operation.

Other objects will appear hereinafter.

The invention consists in the combinations and arrangements of parts hereinafter described and claimed.

The invention will be best understood by reference to the accompanying drawing forming a part of this specification, and in which, Figure 1 is a horizontal section of a trap embodying my invention, Fig. 2, an end view of the same, Fig. 3, a transverse section taken on line *x—x* in Fig. 1, and Fig. 4, a perspective view of a pliable metallic inlet employed in the trap.

The preferred form of construction as illustrated in the accompanying drawing comprises a glass jar 1 having a flattened bottom side 2 and an externally threaded mouth 3, as shown. A pliable or plastic metallic inwardly tapering conical inlet 4 is arranged in the mouth 3 and is provided with a flange 5 at its outer end resting against the edge of mouth 3, as shown in Fig. 1. This inlet is perforated and made of a pliable or plastic metal such as tin, the same being longitudinally slit and the slit edge 6 being over-lapped throughout the length thereof. The inlet 4 is secured in position by means of a threaded metallic cap 7 which is threaded on mouth 3 and is provided with an inwardly extending flange 8 which fits snugly within the mouth of inlet 4 and forms a smooth continuation thereof. By making inlet 4 of pliable or plastic material said inlet may be adjusted in size by merely bending the same and will remain in adjusted position without springing back to its original position.

In use, the jar 1 is provided with a suitable form of bait to attract the insect and is set in a place frequented thereby. By providing an inwardly tapering pliable inlet slit throughout its length, and having its slit edges over-lapped, the inner opening of said inlet may be readily changed in size while the mouth thereof remains of the same size. This feature of adjustment of the inlet is important, especially where it is desired to capture roaches, inasmuch as it will be found that the roaches frequenting a certain place are usually of about the same size, although the roaches frequenting different places may vary largely in size. If the inlet opening were made large enough to permit the ready passage of the largest size of roaches, the smaller sizes would be able to escape therethrough, so that by adjusting the size of the inlet opening of the inlet 4, the trap may be adapted to the capture of roaches of various sizes.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having described my invention what I claim as new and desire to secure by Letters Patent is:

An insect trap comprising a body having a threaded mouth; an inwardly tapering plastic inlet in said mouth having a slit extending longitudinally thereof and its edges along said slit overlapping each other permitting the bending of said inlet to vary the degree of overlapping of said edges and change the size of the opening of said inlet; a perforated cap threaded on said mouth; and a flange on said threaded cap engaging the inner side of said inlet preventing collapsing the outer end of the latter, substantially as described.

In testimony whereof I have signed my name to this specification in the presence of two subscribing witnesses.

CHARLES A. PIPENHAGEN.

Witnesses:
  JOSHUA R. H. POTTS,
  B. G. RICHARDS.